May 23, 1939. J. C. MARIS 2,159,813
LATERAL MOTION DEVICE
Filed March 27, 1937 4 Sheets-Sheet 1

INVENTOR
JAMES C. MARIS
BY
ATTORNEY

May 23, 1939.　　　　　J. C. MARIS　　　　　2,159,813
LATERAL MOTION DEVICE
Filed March 27, 1937　　　　4 Sheets-Sheet 2

INVENTOR
JAMES C. MARIS
BY
ATTORNEY

May 23, 1939. J. C. MARIS 2,159,813
LATERAL MOTION DEVICE
Filed March 27, 1937 4 Sheets-Sheet 3

INVENTOR
JAMES C. MARIS
BY
ATTORNEY

May 23, 1939. J. C. MARIS 2,159,813
LATERAL MOTION DEVICE
Filed March 27, 1937 4 Sheets-Sheet 4

INVENTOR
JAMES C. MARIS
BY
ATTORNEY

Patented May 23, 1939

2,159,813

UNITED STATES PATENT OFFICE 2,159,813

LATERAL MOTION DEVICE

James C. Maris, Glenolden, Pa.

Application March 27, 1937, Serial No. 133,406

6 Claims. (Cl. 105—80)

This invention relates generally to lateral motion devices for locomotive driving wheels, and it is one object of my invention to provide an improved lateral motion device that is simple and economical in construction, operation and maintenance and is compact and rugged consistent with the necessary degree of flexibility to yieldingly restrain lateral motion of the truck or wheels and return of the same to its central position after it is moved laterally.

A further object is to provide an improved type of lateral motion device that will function to a certain degree to restrain the vertical motion of the axle with respect to a locomotive frame.

Other objects and advantages will be more apparent to those skilled in the art from the following description of the accompanying drawings in which.

Figure 1:
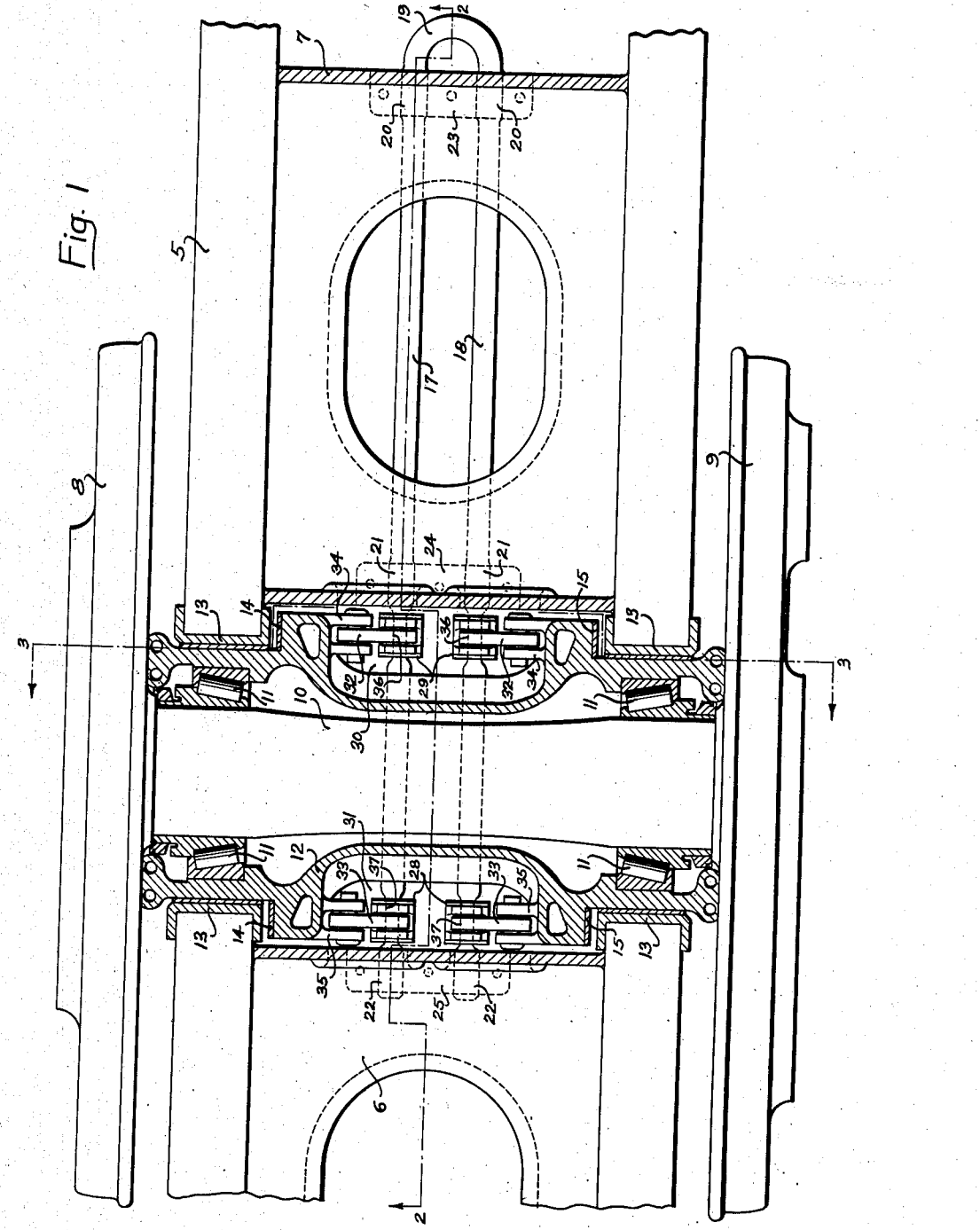
Fig. 1 is a fragmentary plan view of a pair of locomotive driving wheels and a portion of the locomotive frame, the axle housing being shown in section for clarity.

In the particular embodiments of the invention such as are disclosed herein merely for the purpose of illustrating certain specific forms among possible others that the invention might take in practice, I have shown in Fig. 1 a locomotive frame 5 of any usual type having cross webs and tie members 6 and 7. Usual driving wheels 8 and 9 secured to an axle 10 are supported by suitable bearings 11 disposed within end portions of an axle housing 12 and which end portions broadly comprise journal boxes. Only one set of driving wheels is shown although it is obvious that any number may be used depending upon the size of the locomotive. Each set of drivers, axle housing and lateral motion device to be described are identical in each case, and hence it will suffice to describe the same in connection with only one set of wheels. The axle housing is vertically guided in usual pedestals 13. To permit a limited amount of relative lateral movement between the frame and wheels, housing 12 is provided with thrust surfaces 14 and 15 slightly spaced from the inner surfaces of the pedestals 13, 13.

Figure 2:
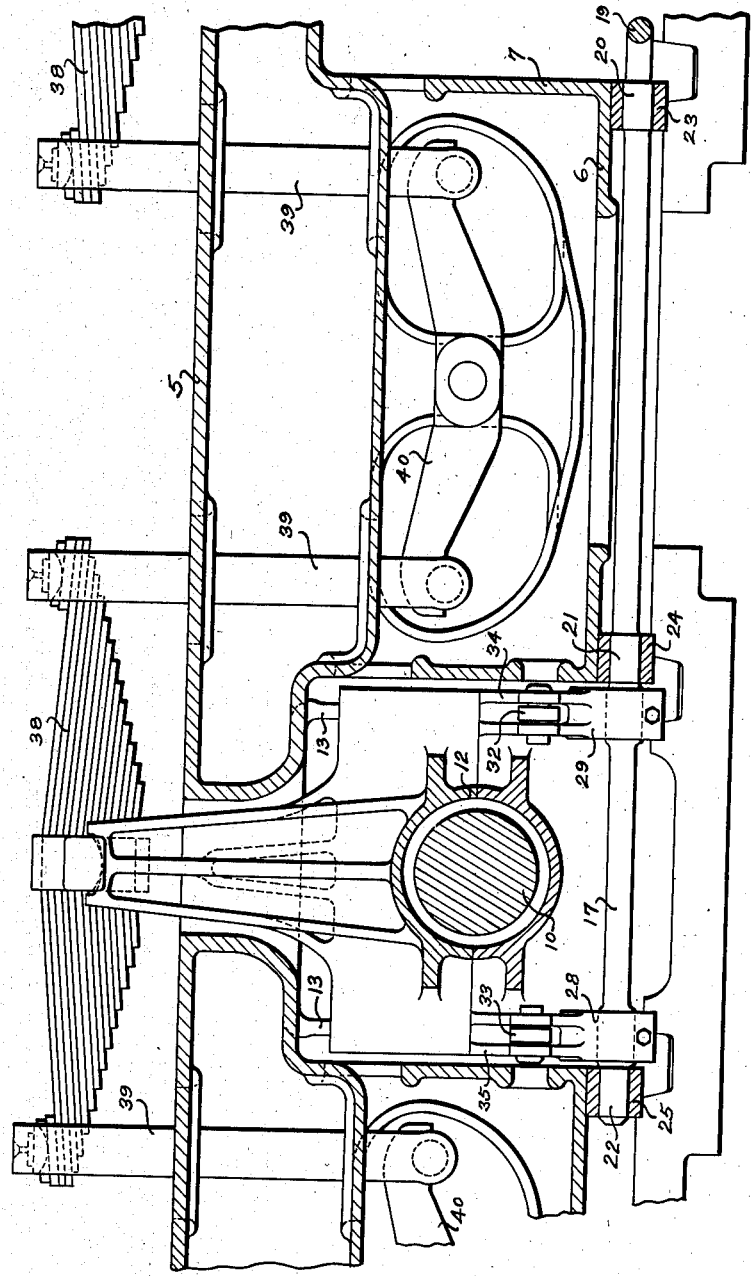
Fig. 2 is a longitudinal vertical section taken on line 2—2 of Fig. 1.

To flexibly restrain such lateral movement of the housing 12 in either direction from its center, I have provided my improved lateral motion device consisting of an elongated U-shaped torsion spring having two legs 17 and 18 reversely bent upon each other to provide a closed end 19. As seen in Fig. 2, each torsion rod 17 and 18 has preferably slightly enlarged journals 20, 21 and 22 supported in bearings 23, 24 and 25. These bearings are suitably secured to or formed as a part of the under side of the cross members 6 and 7, the bearings 24 and 25 being located forwardly and rearwardly of the axle. Thus the axes of the axle and torsion rods are at right angles to each other although disposed in superimposed planes. To connect the rods 17 and 18 to the axle housing, upstanding lugs 28 and 29 are secured thereto and project upwardly into suitably formed axle housing recesses 30 and 31, Fig. 1. Links 32 and 33 pivotally connect lugs 28 and 29 to axle housing lugs 34 and 35. Inasmuch as the lugs and links for operatively connecting the other torsion rod 18 to the axle housing are identical to the elements just described for rod 17, the same reference numbers are employed for corresponding parts, it being noted that the links 32 and 33 for the respective rods 17 and 18 extend laterally away from each other.

The sets of lugs 28 and 29 are firmly secured to the rods 17 and 18 by providing flattened surfaces 36 and 37 on each of the rods. These flattened surfaces are very desirable inasmuch as in the operation of my improved lateral motion device the links 32 and 33 pull on the arms 28 and 29 to twist the rods 17 and 18 upon occurrence of relative lateral motion between the axle and frame. It will be understood that the torsion rods may if desired be subjected to a pre-loaded torsional force, thereby causing these rods to have a greater tendency to return the axle to its central position after being initially moved therefrom. It is also seen that the multiplicity of bearings 23, 24 and 25 insure maximum stability and ruggedness of the lateral motion device while the arrangement as a whole is most compact in that it is adapted to lie immediately below the main frame while at the same time permitting the necessary degree of flexibility which is required in a device of this type.

It will of course be understood that the frame may be supported upon the axle housing through any suitable spring rigging and equalizing system such as is diagrammatically indicated at 38, 39 and 40. Such parts are well known in the art, and hence need not be described further.

Figure 3:
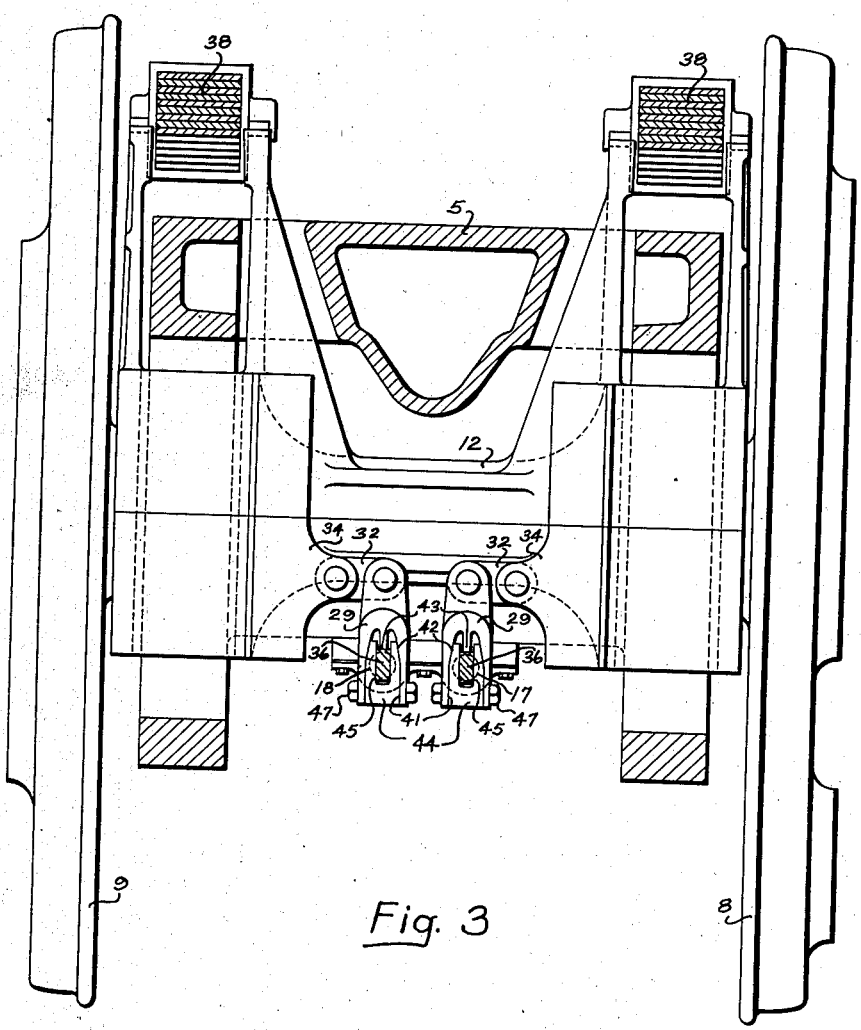
Fig. 3 is a transverse section taken on the line 3—3 of Fig. 1.

To facilitate the assembly of the arms 28 and 29 with the torsion rods 17 and 18, a very simple and effective construction is employed as shown in Fig. 3, wherein each arm 29 has an enlarged vertical slot 41 terminating in inwardly inclined walls 42 and a downwardly projecting stop 43. A block 44 has the general configurations of the walls 41 and 42 and is provided with a vertical slot 45 for receiving the flattened portions 36 of the torsion rods. A bolt 47 extends through the arm 29 and block 44 to rigidly hold the same together while the stop 43 insures proper spacing of the arms with respect to the rods.

Figure 4:
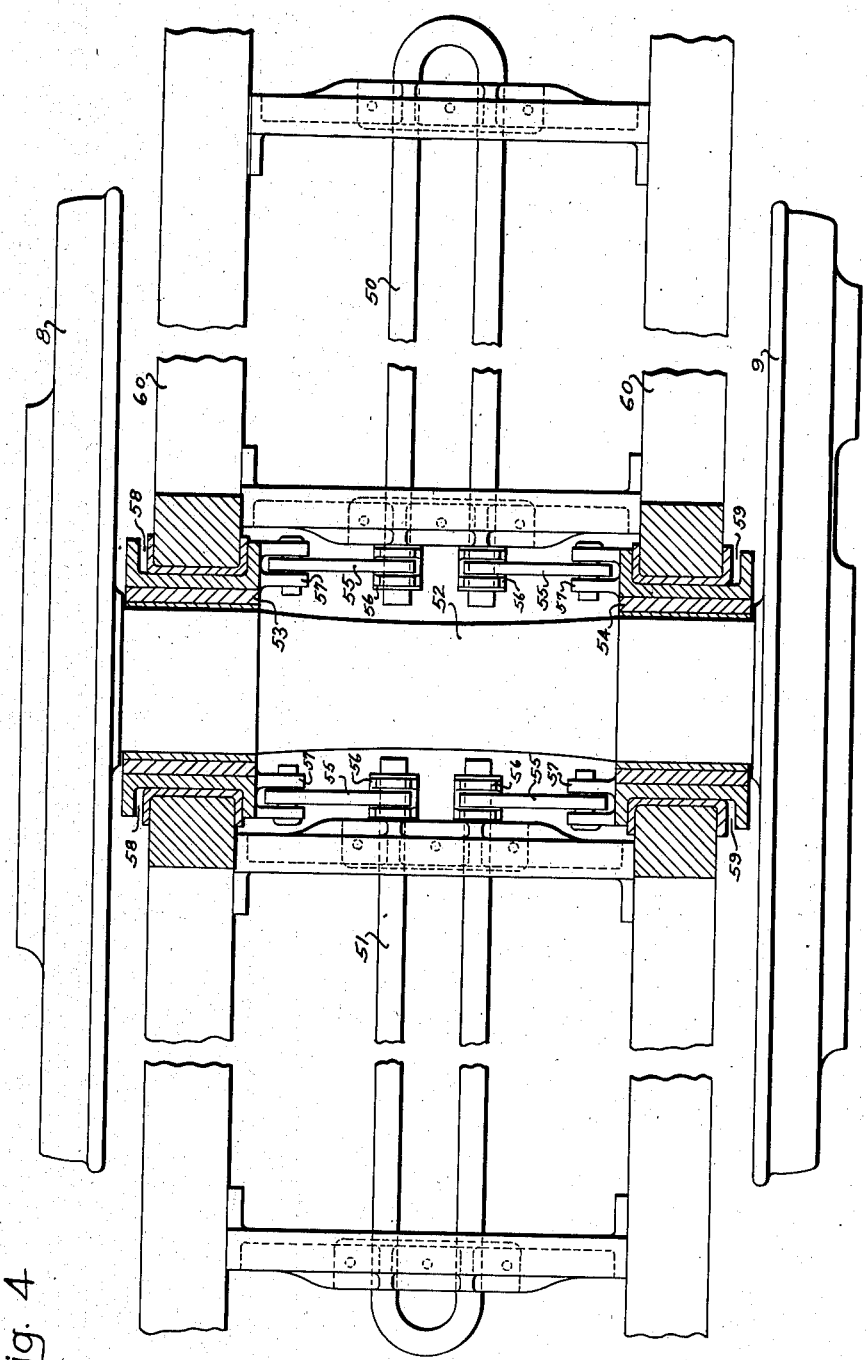
Fig. 4 is a plan view similar to Fig. 1 but showing a modified arrangement of the lateral motion device together with its application to an unenclosed axle.

In the modification shown in Fig. 4, two sets of U-shaped torsion rods 50 and 51 are provided, these rods terminating short of the axle 52. The rods are operatively connected to usual friction type journal boxes 53 and 54 through links, arms and lugs 55, 56, and 57 identical in construction and arrangement as those described for the preferred form. The journal boxes are provided with lateral clearances 58 and 59 on the outside of the locomotive frame 60 instead of on the inside as shown in the preferred form of Fig. 1. The operation of this arrangement is the same as in the preferred form in that lateral motion of the journal boxes relative to the frame will cause the independent sets of rods 50 and 51 to be subjected to torsion, thereby always tending to return the journal boxes and wheels to their central position relative to the locomotive frame. This modified arrangement permits the lateral motion device to have greater torsional strength due to the use of two sets of devices but notwithstanding such increased strength, it is apparent that the devices are compactly arranged with respect to the frame and axle.

From the foregoing disclosures of the two modifications, it is seen that the principle of construction employed is such as to be highly conducive to an efficient, compact, relatively simple and yet sturdy lateral motion device that can be effectively applied to new or existing equipment with no appreciable change in the construction thereof.

It will of course be understood that various changes in details of construction and arrangement of parts may be made by those skilled in the art without departing from the spirit of the invention as set forth in the appended claims.

I claim:

1. In combination, a locomotive frame having pedestals, journal boxes vertically movably guided by said pedestals and having lateral clearance therewith, a wheeled axle journalled in said boxes, springs connected to said frame and supported on said journal boxes, and a lateral motion device including a torsional member and means operatively connecting the same to said journal boxes and to said frame whereby upon occurrence of relative lateral movement between said journal boxes and frame said torsional member is subjected to torsion for yieldingly restraining said lateral movement and restoring the frame and the journal boxes together with the axle to their original relation, said operative connecting means having provision whereby said torsional member is substantially unaffected by vertical movement of said frame and springs.

2. In combination, a locomotive frame having pedestals, journal boxes vertically movably guided by said pedestals and having lateral clearance therewith, a wheeled axle journalled in said boxes, a lateral motion device comprising a U-shaped member supported by said frame in fixed relation thereto, and means operatively connecting the free ends of said U-shaped member to said journal boxes thereby subjecting said member to restraining torsion upon relative lateral movement between the journal boxes and frame.

3. In combination, a locomotive frame having pedestals, journal boxes vertically movably guided by said pedestals and having lateral clearance therewith, a wheeled axle journalled in said boxes, a U-shaped torsional member supported by said frame and extending beneath said axle, means for supporting said member by said frame in fixed relation thereto, and means operatively connecting the legs of said U-member respectively to said journal boxes, whereby said U-shaped member is subjected to torsion in either direction of lateral movement between the journal boxes and frame.

4. In combination, a locomotive frame having pedestals, journal boxes vertically movably guided by said pedestals and having lateral clearance therewith, a wheeled axle journalled in said boxes, a torsional member supported by said frame in fixed relation thereto, and means operatively connecting said torsional member to said journal boxes including a flattened portion on the torsional member, an arm having an enlarged recess, and a block receivable in said recess and provided with an opening for receiving said flattened portion.

5. In combination, a locomotive frame having pedestals, journal boxes vertically movably guided by said pedestals and having lateral clearance therewith, a wheeled axle journalled in said boxes, springs connected to said frame and supported by said journal boxes, a pair of torsional members extending longitudinally in opposite directions from said axle, and means including horizontal connecting links operatively connecting one end of said torsional members to the journal boxes and having other ends of said members connected to said frame in fixed relation thereto, whereby said torsional members are subjected to torsion substantially only upon lateral movement of the frame and substantially independently of vertical movement of the frame and springs.

6. In combination, a locomotive frame having pedestals, journal boxes vertically movably guided by said pedestals and having lateral clearance therewith, a wheeled axle journalled in said boxes, springs connected to said frame and supported by said journal boxes, a pair of U-shaped torsional members extending longitudinally in opposite directions from said axle, and means operatively connecting said torsional members to said frame and to said journal boxes, whereby said torsional members are subjected to torsion substantially only upon lateral movement of the frame and substantially independently of vertical movement of the frame and springs.

JAMES C. MARIS.